United States Patent [19]

Minoura et al.

[11] Patent Number: 4,812,922

[45] Date of Patent: Mar. 14, 1989

[54] STILL VIDEO SIGNAL PLAYBACK APPARATUS WITH STILL VIDEO RECORDING FUNCTION

[75] Inventors: Nobuo Minoura, Yokohama; Katsuo Nakadai, Tokyo, both of Japan

[73] Assignee: Fuji Photo Film Co., Ltd., Kanagawa, Japan

[21] Appl. No.: 50,322

[22] Filed: May 15, 1987

[30] Foreign Application Priority Data

May 16, 1986 [JP] Japan ............................. 61-110564
May 16, 1987 [JP] Japan ............................. 61-110565

[51] Int. Cl.[4] .......................................... H04N 5/781
[52] U.S. Cl. ................................. 360/10.1; 360/14.1; 360/35.1
[58] Field of Search .................... 360/10.1, 14.1, 14.2, 360/14.3, 35.1; 358/342, 906, 311

[56] References Cited

U.S. PATENT DOCUMENTS

| 4,390,908 | 6/1983 | Nakamura et al. | 360/14.2 |
| 4,532,558 | 7/1985 | Oota et al. | 360/35.1 |
| 4,554,602 | 11/1985 | Tobe | 360/14.2 |
| 4,647,987 | 3/1987 | Nutting | 358/906 |
| 4,660,102 | 4/1987 | Kawakami et al. | 360/14.1 |
| 4,719,522 | 1/1988 | Kaneka et al. | 360/10.1 |

Primary Examiner—Donald McElheny, Jr.
Attorney, Agent, or Firm—Birch, Stewart, Kolasch & Birch

[57] ABSTRACT

A still video signal playback apparatus having the capability of recording a still video signal includes an ordinary recording mode and a recording review mode. When the ordinary recording mode has been set, an inputted video signal is recorded on a predetermined track of a magnetic disk by a magnetic head, after which the magnetic head is moved to the next track. When the recording review mode has been set, the apparatus is returned to a playback mode after the inputted video signal is recorded, the recorded picture is played back for a fixed period of time, and then the magnetic head is moved to the next track to stand by for the next command.

5 Claims, 7 Drawing Sheets

OUTER SIDE                    INNER SIDE

STILL VIDEO SIGNAL PLAYBACK APPARATUS WITH STILL VIDEO RECORDING FUNCTION

BACKGROUND OF THE INVENTION

This invention relates to a still video signal playback apparatus in which a magnetic head is moved radially of a rotating magnetic recording medium (hereinafter referred to as a "magnetic disk") having a plurality of recording tracks on which video signals representing still pictures are recorded, thereby to playback a still video signal from any of the tracks. More particularly, the invention relates to a still video signal playback apparatus capable of recording one frame of a still video signal, which is outputted by a television camera, television receiver or the like, on the aforementioned magnetic disk.

A still video playback apparatus plays back a still video signal recorded on a magnetic disk by a so-called electronic still video camera or still video magnetic recording system. When the playback output is applied to a television receiver, a still picture appears on the CRT of the television receiver. The electronic still video camera is a combination of an imaging device such as a solid state electronic imaging element and a recorder that employs a magnetic disk and operates by electronically imaging a subject and recording a still video signal, which represents the still picture of the subject, on the magnetic disk. A still video signal magnetic recording system electronically images a still picture which appears on a visible recording medium such as ordinary film or photographic paper and records the still picture on a magnetic disk.

Though still video signal playback apparatus of the type described above are becoming comparatively popular in both the private and business sectors, there is a desire for the addition of new functions so that such apparatus can find use in a wider range of applications. One such function is a recording function, in which a video signal indicative of one frame (one picture or screen) of continuous video imaged by a television camera or of one instantaneous frame of a moving picture appearing on a television receiver is recorded in the form of a still video signal on a magnetic disk. It is also required that the apparatus have the capability of immediately verifying whether a desired picture has been recorded when one frame is recorded.

SUMMARY OF THE INVENTION

An object of the present invention is to provide a general-purpose still video signal playback apparatus equipped with a recording function and recording verification function in order to satisfy the aforementioned requirements.

Another object of the present invention is to provide a still video signal playback apparatus which solves problems that arise when a still video signal playback apparatus is equipped with a recording verification function.

According to the present invention, the foregoing objects are attained by providing a still video signal playback apparatus having a magnetic head transfer device for holding a magnetic head which is movable radially of a rotating magnetic disk on which are provided a plurality of circular, concentrically arranged tracks, and for moving the magnetic head a predetermined amount in a predetermined direction, and a playback processing circuit for processing a still video signal read from the magnetic disk by the magnetic head and leading the processed still video signal to an output terminal as a playback still video signal, the apparatus comprising a recording processing circuit for processing a video signal supplied to an input terminal and outputting a still video signal for recording, a first switch for setting an ordinary recording mode, a second switch for setting a recording review mode, a changeover switching circuit for selectively connecting the magnetic head to an input side of the playback processing circuit and an output side of the recording processing circuit, recording control means responsive to a switching input from either of the first and second switches for controlling the changeover switching circuit in such a manner that the magnetic head is connected to the output side of the recording processing circuit at a predetermined timing, first transfer control means responsive to a switching input from the first switch for executing control in such a manner that the magnetic head transfer device is driven to move the magnetic head one track in a predetermined direction after recording under control of the recording control means ends, review control means responsive to a switching input from the second switch for controlling the changeover switching circuit in such a manner that the magnetic head is connected to the input side of the playback processing circuit for a predetermined period of time after recording under the control of the recording control means ends, and second transfer control means for executing control in such a manner that the magnetic head transfer device is driven to move the magnetic head one track in a predetermined direction after playback for a predetermined period of time ends following changeover to the playback side by the review control means.

Thus, when the ordinary recording mode is set, an input video signal is recorded on a predetermined track of the magnetic disk by the magnetic head, after which the magnetic head is fed to the next track. When the recording review mode is set, operation returns to the playback mode after the input video signal is recorded, the picture recorded is played back for a fixed period of time, and then the magnetic head is fed to the next track to stand by.

Accordingly, a video signal representing one instantaneous frame of a moving picture appearing on a television receiver or one frame of a picture being photographed by a television camera can be recorded on a magnetic disk, and when one frame is thus recorded, immediate verification is possible to determine whether the desired picture has indeed been recorded. Further, since the magnetic head is fed to the next track immediately after a recording is made, a rapid transition can be made to the subsequent recording operation.

It is not sufficient for the recording of a still video signal on a magnetic disk to be performed at an arbitrary timing; unless the recording is made using a certain reference angle position of the disk as a reference, synchronization at playback will be lost. A phase detector is provided in order to detect the reference angle position of the magnetic disk. According to specifications, recording or playback should take place in such a manner that the edge of a vertical synchronizing signal appears 7H after the phase is detected by the phase detector (where H is the period of time between two neighboring horizontal synchronizing signals).

A still video signal playback apparatus generally incorporates a synchronizing signal oscillator circuit, and the rotation of the magnetic disk is controlled in such a manner that the generated synchronizing signal and aforementioned phase detection signal satisfy the abovementioned relationship. This is referred to as "internal synchronization".

When it is attempted to record an input video signal on a magnetic disk, it becomes necessary for the synchronizing signal contained in the video signal and the rotational phase of the magnetic disk to be held in the aforementioned predetermined relationship. Accordingly, whereas the synchronizing signal produced by the internal oscillator circuit is employed at the time of playback, an external synchronizing signal separated from the input video signal is employed to control the rotational phase of the magnetic disk at the time of recording. This is referred to as "external synchronization".

The aforementioned recording review mode is for effecting a transition to the playback mode immediately after one frame of the inputted video signal is recorded on the disk. Then, in the playback mode, the recorded picture is played back for a fixed period of time (e.g. 2 sec). If the prior-art technique of applying external synchronization at recording and internal synchronization at playback is followed in the recording review mode, a certain problem arises. Specifically, when, in the recording review mode, external synchronization is performed at recording and then a changeover is made to internal synchronization when playback is carried out for a fixed period of time, the rotational phase of the magnetic disk is temporarily shifted, resulting in a visible disturbance in the played back picture.

Accordingly, in another aspect of the present invention, there is provided a still video signal recording/playback apparatus having a motor for rotating a magnetic disk, a phase detector for generating a signal representing rotational phase of the magnetic disk, a circuit for generating a video signal synchronizing signal, and a motor controller, to which are inputted a phase signal produced by the phase detector and the synchronizing signal generated by the synchronizing signal generating circuit, for controlling the motor in such a manner that the motor rotates at a predetermined rotational speed and the phase signal and synchronizing signal inputted thereto are held in a predetermined relationship. The synchronizing signal generating circuit comprises an oscillator circuit for producing the synchronizing signal, a synchronizing separator circuit for extracting the synchronizing signal from an inputted video signal, and a changeover switch for selecting an output of the synchronizing separator circuit in a recording mode and an output of the oscillator circuit in a playback mode. The apparatus further includes means for controlling the changeover switch in such a manner that, when a recording review mode included in a recording mode has been set, the changeover switch selects the output of the synchronizing separator circuit also at the time of a playback operation performed for a fixed period of time following recording.

Thus, in accordance with the invention, external synchronization is adopted as an exception only at the time of playback in the recording review mode. Accordingly, external synchronization is applied at the time of recording in the recording review mode and also at the time of subsequent playback in this mode, so that there is no changeover in the synchronizing signals.

The magnetic disk thus continues rotating in the same phase. As a result, the picture at playback is undisturbed.

These and other characterizing features of the present invention will become clear from a description of preferred embodiments with reference to the accompanying drawings.

BRIEF DESCRIPTION OF THE DRAWINGS

FIGS. 6 through 8 illustrate examples of recording processing executed by a CPU, in which FIG. 6 shows a key scan routine and FIGS. 7 and 8 illustrate interrupt processing.

DESCRIPTION OF THE PREFERRED EMBODIMENT (1) External appearance of still video signal playback apparatus with still video signal recording function FIG. 1 illustrates the external appearance of the still video signal playback apparatus, which is designated generally at numeral 10. The apparatus 10 has a front control panel 11 divided into right- and left-hand sections. The left-hand section has a bucket 13 for accommodating a disk pack 20 and a bucket cover 12 each pivotally supported at its lower edge. By pressing an eject button 16, the closed cover 12 and bucket 13 open mechanically to the attitudes shown in phantom in FIG. 1. If the cover 12 is pressed toward the panel 1, the cover 12 and bucket 13 are closed and locked. Provided at the left of the cover 12 are a power button 14 and power indicator lamp 15.

Figure 1:
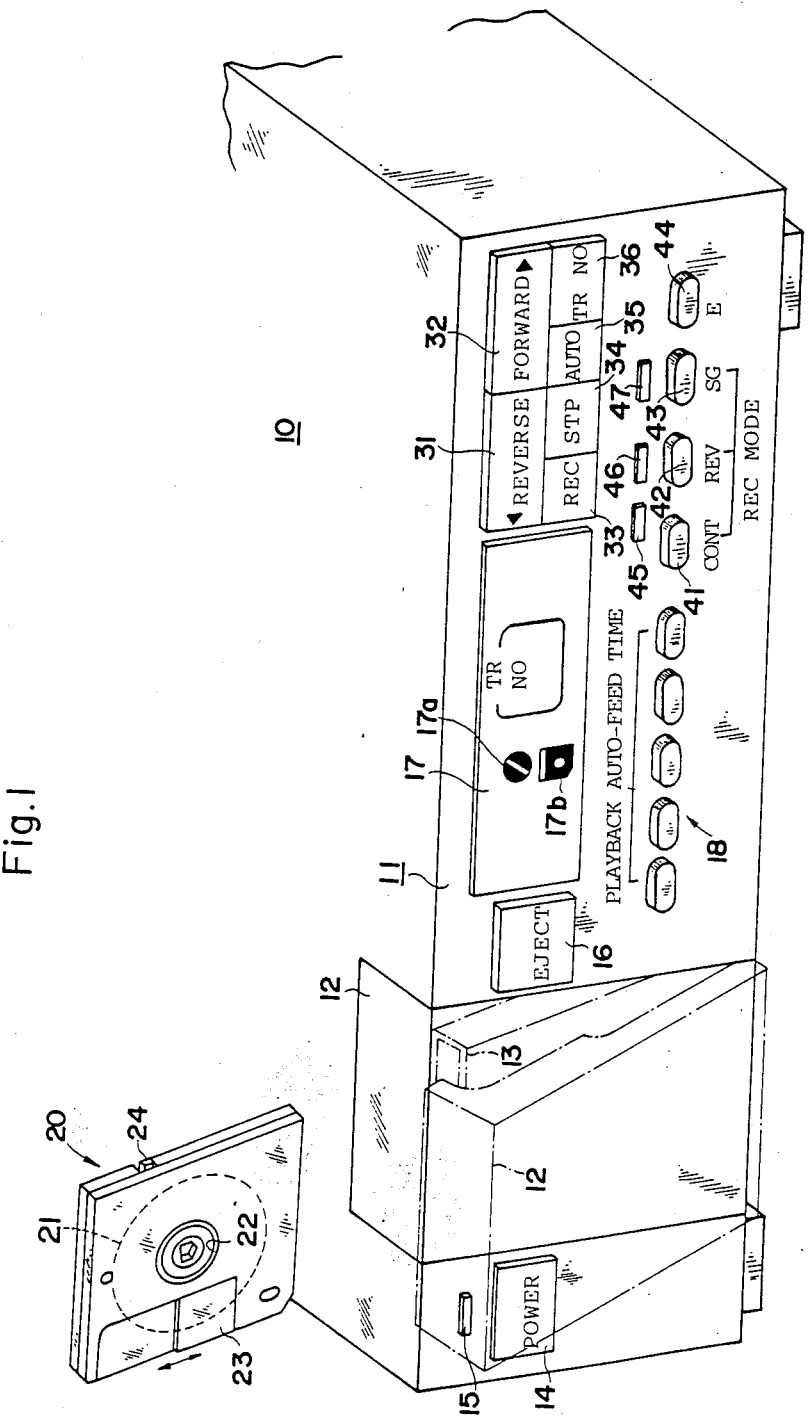
FIG. 1 is an perspective view showing the external appearance of a still video signal playback apparatus according to the present invention.

The disk pack 20 is composed of a case accommodating a magnetic disk 21, which is thin and of a small diameter, in such a manner that the disk 21 is capable of being rotated within the case. Formed in the case at substantially the central portion thereof is a circular opening 22 designed so that a hub or core located at the center of the magnetic disk 21 is exposed at the opening 22. One side edge of the disk pack 20 is provided with a shutter 23 capable of back-and-forth movement in a direction parallel to this edge. The shutter 23 is opened when the disk pack 20 is inserted into the bucket 13, thereby allowing a retaining plate 53 and magnetic head 51 (see FIG. 4), described below, to contact the magnetic disk 21 within the pack 20. One side of the case of disk pack 20 is provided with a finger 24 for preventing inadvertent recording.

The magnetic disk 21 is provided with a plurality (e.g. 50) of circular, concentrically disposed tracks having a track pitch of e.g. 100 μm. Magnetically recordable on each track is a frequency-modulated color still video signal (inclusive of luminance and chrominance signals, etc.) corresponding to one frame.

Figure 2:
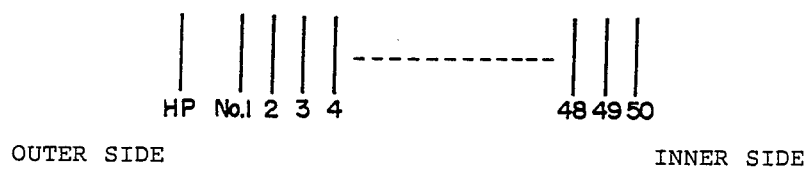
FIG. 2 is a view illustrating the numbers of tracks on a magnetic disk and a home position.
Figure 4:
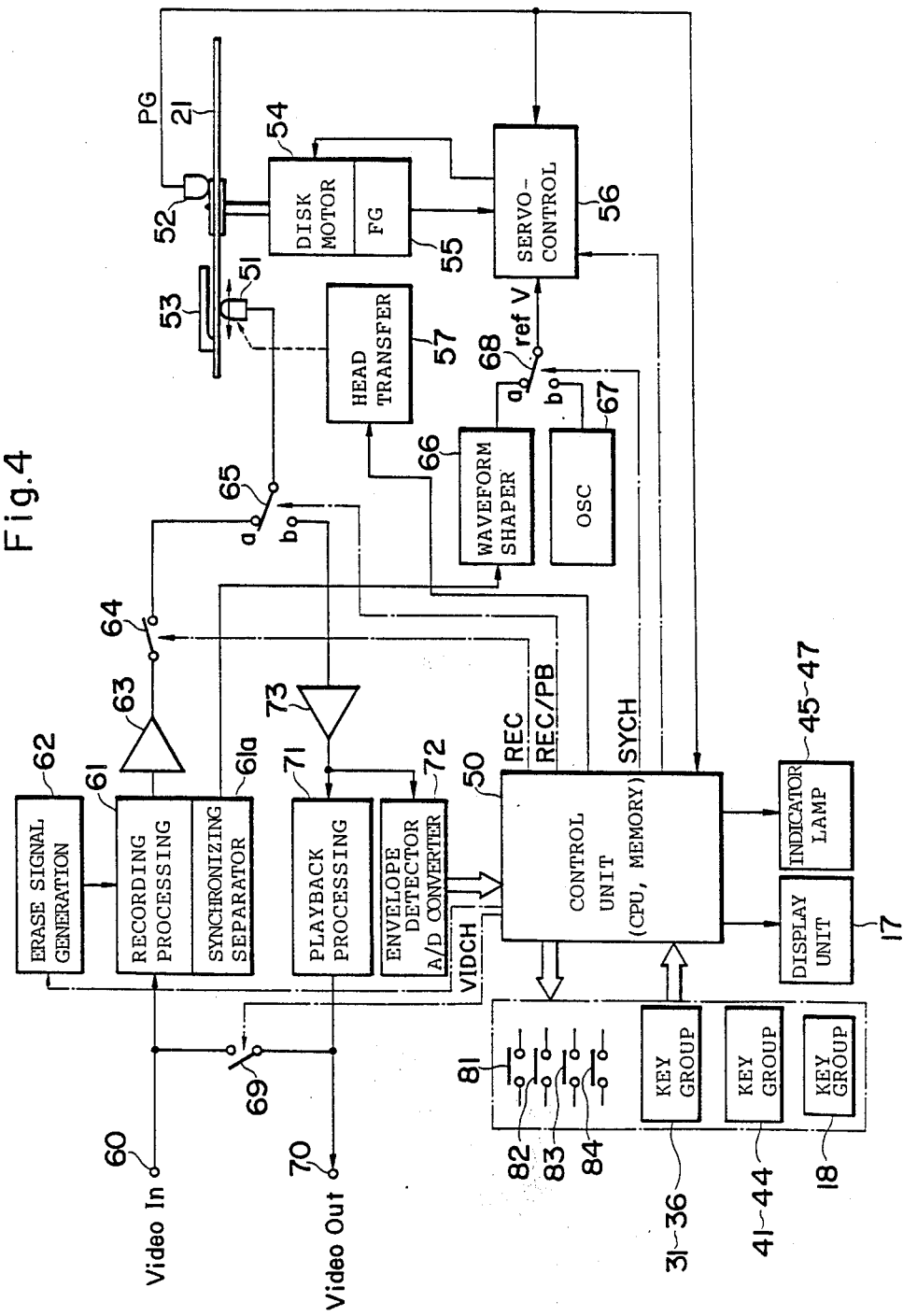
FIG. 4 is a block diagram showing the electrical construction of a still video signal playback apparatus according to the invention.

FIG. 2 illustrates the relationship between the tracks provided on the magnetic disk 21 and a home position HP of a magnetic head. The 50 tracks are circular and concentrically disposed on a magnetic recording surface of the magnetic disk 21 and are numbered consecutively from No. 1 to No. 50 starting from the outer side of the disk. The home position HP, which is situated on the outer side of track No. 1, is not attached to the magnetic disk 21 but is a limit position assigned to the path along which the magnetic head travels. When the magnetic head arrives at the home position HP, this is sensed by a home position switch 84 (FIG. 4).

With reference again to FIG. 1, the right-hand section of the front control panel 11 is provided with a display device 17, various key switches and indicator lamps. The display device 17 is, for example, a liquid crystal display device for displaying the Track No. of the magnetic disk 21 at which a magnetic head 51 is presently located, various warnings (indicated at 17a), and a pack loaded symbol (indicated at 17b) which indicates that the disk pack 20 has been received in the bucket 13 and that the bucket 13 has been closed.

The key switches include keys 31, 32, 33, 34, 35 and 36 for designating various operations, keys 41, 42, 43 and 44 for setting various modes, and a key 18 for setting an automatic feed time in the playback mode. Indicator lamps 45, 46, 47 correspond to the keys 41, 42, 43; pressing any one of these keys causes the corresponding indicator lamp to light. The functions of these key switches will become clear in the section (2) that follows.

(2) Operating modes and transition thereto

The still video signal playback apparatus is capable of still picture playback and recording. When a still video signal has been recorded on the magnetic disk 21, playback is possible from the track on which the signal has been recorded. Playback refers to reading a frequency-modulated signal from a predetermined track of a magnetic disk by a magnetic head, demodulating the signal and outputting a standard color television video signal in, say, an NTSC format. If the output terminal for the video signal is connected to a television receiver, the reproduced still picture is displayed on the CRT of the television receiver. Assume that what is to be recorded is an input of a standard color television video signal. The video signal is provided by e.g. a television camera or television receiver. Recording refers to frequency modulating one frame of the provided moving picture video signal and writing the resulting signal on a predetermined track of a magnetic disk by a magnetic head.

Generally, in order to perform interlaced scanning when displaying a picture on a television, the video signal is formed is such a manner that one frame is composed of two fields. However, in the aforementioned still video signal recording apparatus using an electronic still video camera or the like, recording of a still video signal on a magnetic disk often is carried out in such a manner that one frame (one picture) is composed of one field. This is for the purpose of conserving the recording surface of the magnetic disk on which the still video signal is recorded, and for other purposes as well. This is referred to as "frame recording". The technique of obtaining a picture of one frame with two fields as described above is referred to as "frame recording". Though frame recording is adopted in the illustrated embodiment of the invention, it goes without saying that the invention can also be applied to field recording.

Three forms of the recording mode are available, namely single-frame recording (which means one still picture recording in both field recording and frame recording), recording review and continuous recording. In the recording mode (strictly speaking, a recording standby mode, described below), the magnetic head must be made to stand by on a blank track of the magnetic disk. When single-frame recording is selected, a still video signal corresponding to one frame (one picture) is recorded on the track, after which the magnetic head is immediately moved to the next track (toward the inner side of the disk) and made to stand by at this track. In the recording review mode, a still video signal corresponding to one frame is stored on a track, after which the still video signal recorded on this track is immediately played back and outputted for a fixed period of time (e.g. 2 sec), followed by moving the magnetic head to the next track, where the head stands by. In the continuous recording mode, the above-described single-frame recording operation is continued. For example, the single-frame recording operation is performed six to eight times for one second.

Figure 3:
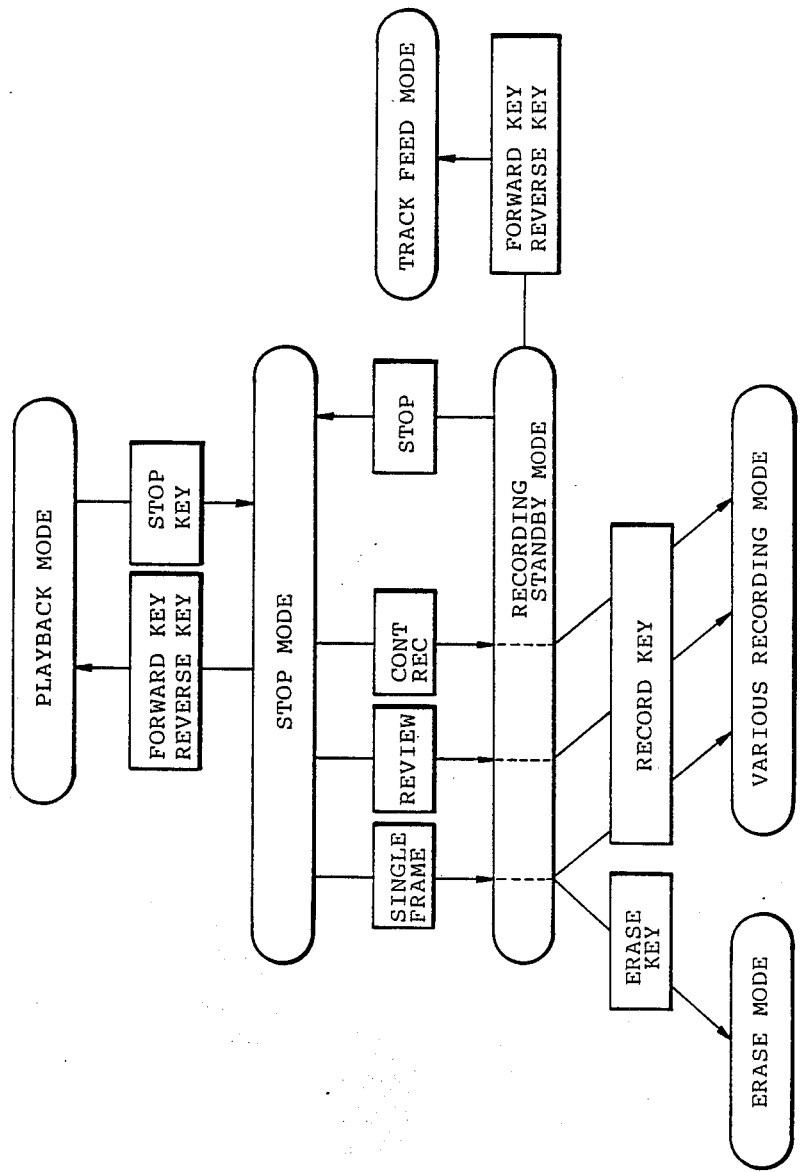
FIG. 3 is a view showing various operating modes and the manner in which a transition is made to these operating modes in response to inputs from various keys.

The aforementioned recording and other operations will now be described, in connection with the various keys shown in FIG. 1, with reference to FIG. 3.

When a single-frame key 43, review key 42 or continuous recording key 41 is pressed in a stop mode, the corresponding indicator lamp 47, 46 or 45 lights, the key pressed is memorized and the apparatus enters the recording standby mode. When a record key 33 is then pressed, one frame is recorded if depression of the single-frame key 43 has been memorized, and the recording review operation is performed if depression of the review key 42 has been memorized. The apparatus returns to the standby mode after these operations are performed. If the record key 33 is pressed when depression of the continuous recording key 41 has been memorized, the continuous recording operation is executed while the record key 33 is being pressed. When the record key 33 is released, the apparatus returns to the standby mode.

In order to prevent double recording on one track, each of the aforementioned recording operations is inhibited and the corresponding indicator lamps 45–47 are made to flicker if a signal has already been recorded on a track at which the magnetic head is positioned. Whether or not a signal has been recorded on a track is determined by an envelope detection output, described below.

In such case, the magnetic head can be moved to a neighboring track on the inner or outer side of the present track by pressing a forward key 32 or reverse key 31. This is a track feed mode. Whenever one of the keys 31, 32 is pressed one time, the magnetic head is moved one track, after which the apparatus returns to the recording standby mode.

It is of course possible to adopt an arrangement in which after a still video signal is recorded in each recording operation, a search is performed for the next blank track.

If a signal already recorded on a track is to be erased, the single-frame key 43 is pressed in the stop mode, then an erase key 44 is pressed. When erasure of this track ends, the apparatus returns to the recording standby mode.

When a stop key 34 is pressed in the recording standby mode, the magnetic head is moved one track in the reverse direction and the apparatus returns to the stop mode, except for a case where erasure has been carried out. The reason for this is that in the three aforementioned recording modes, the magnetic head is moved one track in the forward direction after recording.

If the forward key 32 or reverse key 31 is pressed in the stop mode, a transition is effected to the playback mode and the still video signal recorded on the track at which the magnetic head is located is played back. If the forward key 32 or reverse key 31 is pressed again, the magnetic head is moved one track inward or outward and the signal on the track attained is played back. If an automatic feed key 35 is pressed and an automatic feed time period is set by key group 18, the magnetic head is moved one track at a time in the forward direction for each set time period and each track traversed is played back. When a track number display key 36 is pressed, a signal for indicating the number of the track at which the magnetic head is located is superimposed on the played back still video signal and is outputted together therewith. For example, the track number is displayed at the upper right corner of the CRT display screen. The apparatus returns to the stop mode, when the stop key 34 is pressed in the playback mode.

The number of the track at which the magnetic head is presently located is displayed on the display device 17 in each of the above-described modes.

In an initial state established when power is connected by the power switch 14, the magnetic head returns to the home position HP temporarily and then is moved inwardly a predetermined distance from this point until it is positioned on Track No. 1.

In the recording mode, magnetic head transfer is performed in accordance with a so-called "absolute track address" method. Specifically, though the magnetic head is transferred diametrically of the magnetic disk, the position of each track at which the magnetic head is to be positioned is decided by the distance from the home position HP, using the home position as a reference at all times.

After the approximate position of the magnetic head has been decided in accordance with the absolute track address method in the playback mode, position is finely controlled based on envelope detection, described below, in such a manner that the center of the magnetic head is registered with the position of the center of a recorded signal.

(3) Electrical construction and operation of still video signal playback apparatus with still video signal recording function FIG. 4 illustrates the electrical construction of the still video signal playback apparatus.

The overall operation of the apparatus is under the control of a control unit 50. The latter comprises a central processor, preferably a microprocessor (hereafter referred to as a "CPU"), a memory for storing a program run by the CPU and necessary data, and an interface for providing a connection to peripheral elements, circuits and devices.

When the disk pack 20 is loaded in the bucket 13 and the latter is closed, the magnetic disk 21 in the disk pack 20 is loaded on a spindle of a disk motor 54. Since the recording or playback by the magnetic head 51 is performed while the magnetic disk 21 is rotated, a retaining plate 53 is provided in the cover 12 in order to maintain good contact between the magnetic head 51 and magnetic disk 21 at all times. The retaining plate 53 has a groove along the path of travel of magnetic head 51 and contacts or approaches the magnetic disk 21 except at the portion where the groove is located, so that the magnetic disk 21 is embraced by the retaining plate 53 and magnetic head 51. As mentioned above, the magnetic head 51 is disposed so as to move freely in the radial direction of the magnetic disk 21 and contacts the magnetic recording surface of the disk. The magnetic disk 21 has a core on one point of which is provided a magnetic body for allowing the leakage of some of the flux from a chucking permanent magnet provided on the core. Arranged near the core is a phase detector 52 which senses the leakage flux for generating a single phase detection pulse PG whenever the magnetic disk 21 makes one revolution.

Figure 5:
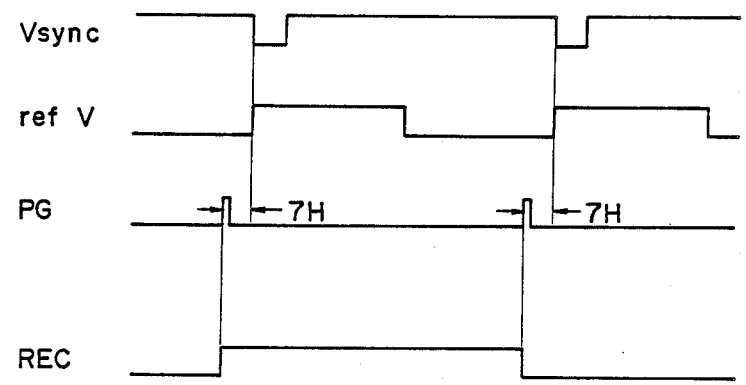
FIG. 5 is a time chart illustrating synchronous control of a disk motor by means of a servo-control circuit as well as recording timing.

The phase detection pulse PG from the phase detector 52 is inputted to a servo-control circuit 56 and the control unit 50. A frequency generator 55 provided on the disk motor 54 outputs a signal the frequency of which is proportional to the rotational speed of the motor 54. This signal is applied to servo-control circuit 56, which also receives a vertical synchronizing reference signal refV as an input. Based on these input signals, the servo-control circuit 56 rotates the disk motor 54 at a constant speed, e.g. 3600 rpm, and controls the rotational phase of the motor 54 in such a manner that the phase pulse PG is advanced 7H ahead of the rising edge of the reference signal refV (where H is the time period between two successive horizontal synchronizing signals), as shown in FIG. 5. The servo-control circuit 56 also starts and stops the motor 54 in response to a command from the control unit 50.

The significance of phase control of motor 54 performed by the servo-control circuit 56 will now be described.

Let us consider a case where a frequency-modulated still video signal is recorded on a predetermined track of the magnetic head 51. A color still video signal of a standard format applied to an input terminal 60 from a television camera, television receiver or the like has its luminance signal component and chrominance signal component frequency modulated by a recording processing circuit 61. These modulated signals are mixed before being applied to an amplifier circuit 63. The amplified frequency-modulated signal is applied to the magnetic head 51 through a recording control switch 64 and recording/playback changeover switch 65. Meanwhile, horizontal and vertical synchronizing signals of the input still video signal are extracted by a synchronizing separator circuit 61a. A waveform shaper circuit 66 forms and outputs the reference signal refV having a leading edge synchronized to the leading edge of a vertical synchronizing signal Vsync and possessing a duty ratio of approximately ½, as shown in FIG. 5. The reference signal refV is applied to the servo-control circuit 56 through a synchronous changeover switch 68. (This is external synchronization, mentioned above.) Accordingly, recording of a still video signal on the magnetic disk 21 is performed in such a manner that recording of the vertical synchronizing signal starts from a reference position, which is that obtained by shifting the rotational angle, by an amount corresponding to the time period of 7H, from the position of the magnetic element which generates the phase pulse PG.

For playback, a similar vertical synchronizing reference signal refV is generated by an oscillator circuit 67 and the signal is applied to the servo-control circuit 56 via the switch 68. (This is internal synchronization, referred to earlier in the specification.) By controlling the phase of the motor 54 through the servo-control circuit 56 using the reference signal refV and phase pulse PG, a still video signal in which the vertical synchronizing signal always begins from a point in time delayed by 7H relative to the pulse PG is read by the magnetic head 51.

The phase pulse PG is applied to the control unit 50. Since the still video signal is synchronized to the pulse PG at a fixed delay at both recording and playback, the control unit 50 is capable of performing timing control in various types of processing using the pulse PG as a reference. This is the significance of phase control of motor 54.

The modulated still video signal read from the magnetic head 51 is inputted to an amplifier circuit 73 via the changeover switch 65, the output of which is applied to a playback processing circuit 71 and envelope detector circuit 72. The playback processing circuit 71 demodulates and mixes the inputted modulated luminance signal and chrominance signal and outputs the result to an output terminal 70 as a standard color still video signal. When this still video signal is applied to a television receiver, one frame of still picture is displayed on the CRT.

An erase signal generating circuit 62 is operable in the erase mode to generate an erase signal, e.g. a signal the frequency of which is swept continuously over a range 4.5–20 MHz in a fixed period of time (e.g. 1 sec).

The magnetic head 51 is supported to be freely movable in the radial direction of the magnetic disk 21 and the transfer thereof in the same direction is controlled by a transfer drive control device 57. The control unit 50 provides the device 57 with commands indicating the transfer direction of the magnetic head 51 and the amount of transfer. The device 57 includes a stepping motor, with the magnetic head being fed by an amount proportional to the rotational angle of this motor. For example, the stepping motor rotates by about 15° C. per stepping motor drive pulse, whereby the magnetic head 51 is shifted by a mount 8.33 $\mu$m (one pitch). Accordingly, transfer of the magnetic head 51 can be performed very accurately.

The envelope detector circuit 72 detects the envelope of the signal read by the magnetic head 51, namely the envelope of the frequency-modulated still video signal recorded on a track of the magnetic disk 21, and outputs a voltage signal conforming to the detected envelope. This voltage signal representing the envelope is converted into an eight-bit digital signal representing a quantization level of e.g. 256 by an analog/digital (A/D) converter incorporated in the circuit 72. The converted signal enters the control unit 50.

The envelope detection signal is used to search for blank tracks on the magnetic disk 21 and to detect the center position of tracks on which recording has already been performed. If the level of the detection signal does not attain a predetermined threshold level when the magnetic head 51 is fed so as to traverse a track, this means that the track is blank. After the magnetic head 51 is positioned in accordance with the absolute address method at playback of the still video signal, the magnetic head 51 is moved one pitch inward or outward to search for a position at which the detection signal peaks. A position where the signal peaks is judged to be the center of the track on which the still video signal has been recorded. The still video signal is played back in a state where the magnetic head 51 is positioned at the center of this track. The peak search is carried out in the same way at erasure of a still video signal. Whatever has been recorded within a fixed range on both sides of the peak positioned is erased.

The recording control switch 64, recording/playback changeover switch 65, synchronous changeover switch 68 and a video output control switch 69 are contact switches in the illustrated embodiment. However, it is obvious that these can also be realized by contactless switches comprising semiconductor elements or the like. The on/off action of these switches is controlled by the control unit 50 in a manner which will now be described.

In the recording mode, the switch 64 is turned on (closed) at a fixed timing, the switch 65 is connected to a terminal a leading to the recording processing circuit 61, the switch 68 is connected to a terminal a leading to the waveform shaping circuit 66, and the switch 69 is on, these switch states prevailing except in the cases described below. More specifically, when the recording standby mode is established, the changeover switches 65, 68 are changed over as set forth above in response to a recording/playback changeover signal REC/PB and synchronization changeover signal SYCH, respectively, from the control unit 50. The switch 69 is turned on by a video output control signal VIDCH from the control unit 50. When the recording key 33 is pressed, the switch 64 is turned on by a recording control signal REC from the control unit 50 only for a period of time equivalent to the interval between two consecutive pulses PG, as shown in FIG. 5. Accordingly, the frequency-modulated still video signal is fed to the magnetic head 51 over this interval so that one field of the signal is stored in one revolution of the magnetic disk 21. Since the switch 69 is on at this time, the still video signal being inputted to the input terminal 60 is delivered as such to the output terminal 70.

If the recording review key 42 has been memorized (i.e. if the recording review mode is in effect), playback is performed after recording, as described earlier. Accordingly, when recording by the magnetic head 51 ends, the switch 65 is changed over to a terminal b leading to the playback processing circuit 71, and the switch 69 is turned off (opened), in sync with the PG signal. As a result, the still video signal read by the magnetic head 51 is outputted as a playback signal from the output terminal 70. The switches 65, 69 return to the abovementioned states upon passage of a fixed period of time.

The changeover switch 68 remains connected to the terminal a and external synchronization is carried out even at playback in the recording review mode. In other words, since the still video signal is being inputted at the input terminal 60, servo-control is performed using the synchronizing signal of this video signal as a reference.

As will be illustrated later, the changeover switch 68 is connected to a terminal b leading to the oscillator circuit 67 to establish internal synchronization in the playback mode. At playback in the recording review mode, however, there is no changeover from external to internal synchronization, so that external synchronization continues throughout. The reason for this is that when a changeover is made from external to internal synchronization, the rotational phase of the disk motor 54 shifts temporarily, causing distortion in the still video signal from the output terminal 70 and, hence, a disturbance in the picture displayed on the CRT.

The states of the switches 64, 65, 68 and 69 in the erase mode are the same as those in the recording mode.

In the playback mode, the switches 64, 69 are held in the off state, switch 65 is changed over to terminal b, and switch 68 is changed over to terminal b as well.

The changeover to the operating modes and the various operations all are performed on the basis of inputs from various switches and keys. The switches include a load end switch 81 for sensing that the bucket 13 has been closed to a position at which the magnetic disk 21 contained therein should be reliably loaded on the spindle of disk motor 54, a pack switch 82 for sensing that disk pack 20 has been received in the closed bucket 13, an inadvertent recording prevention switch 83 for sensing that the inadvertent recording prevention finger 24 on disk pack 20 loaded in the bucket 13 has been cut away (thus forbidding recording), and the aforementioned home position switch 84. The various keys include the aforementioned keys 31–36, 41–44 and 18 provided on the front control panel 11. The control unit 50 executes a key scan routine at a prescribed cycle (e.g. 1/60 sec). In the key scan routine, the control unit 50 transmits key scan pulses to the abovementioned switches and keys, senses the on/off states of these switches and keys based on whether pulses return therefrom, and stores the states sensed.

The control unit 50 also executes display control of the indicator lamps 45–47 based on the key scan routine, as well as display control of the display device 17 based on the routines of various operations.

(4) Recording processing

Finally, operation in the recording mode will be explained from the viewpoint of a processing executed by the CPU in the control unit 50.

Before proceeding with the explanation, let us consolidate the main conditions for recording. These are as follows: that the track at which the magnetic head 51 is located is blank (meaning that the envelope detector output is below the threshold level); that the inadvertent recording prevention finger 24 of disk pack 20 has not been cut away (known from the output of the inadvertent recording prevention switch 83); and that the recording standby mode prevails (meaning that any one of the single-frame switch 43, review switch 42 or continuous recording switch 41 is being pressed). In order to avoid complications, the first two conditions in particular will not be touched upon in the description that follows.

Figure 6:
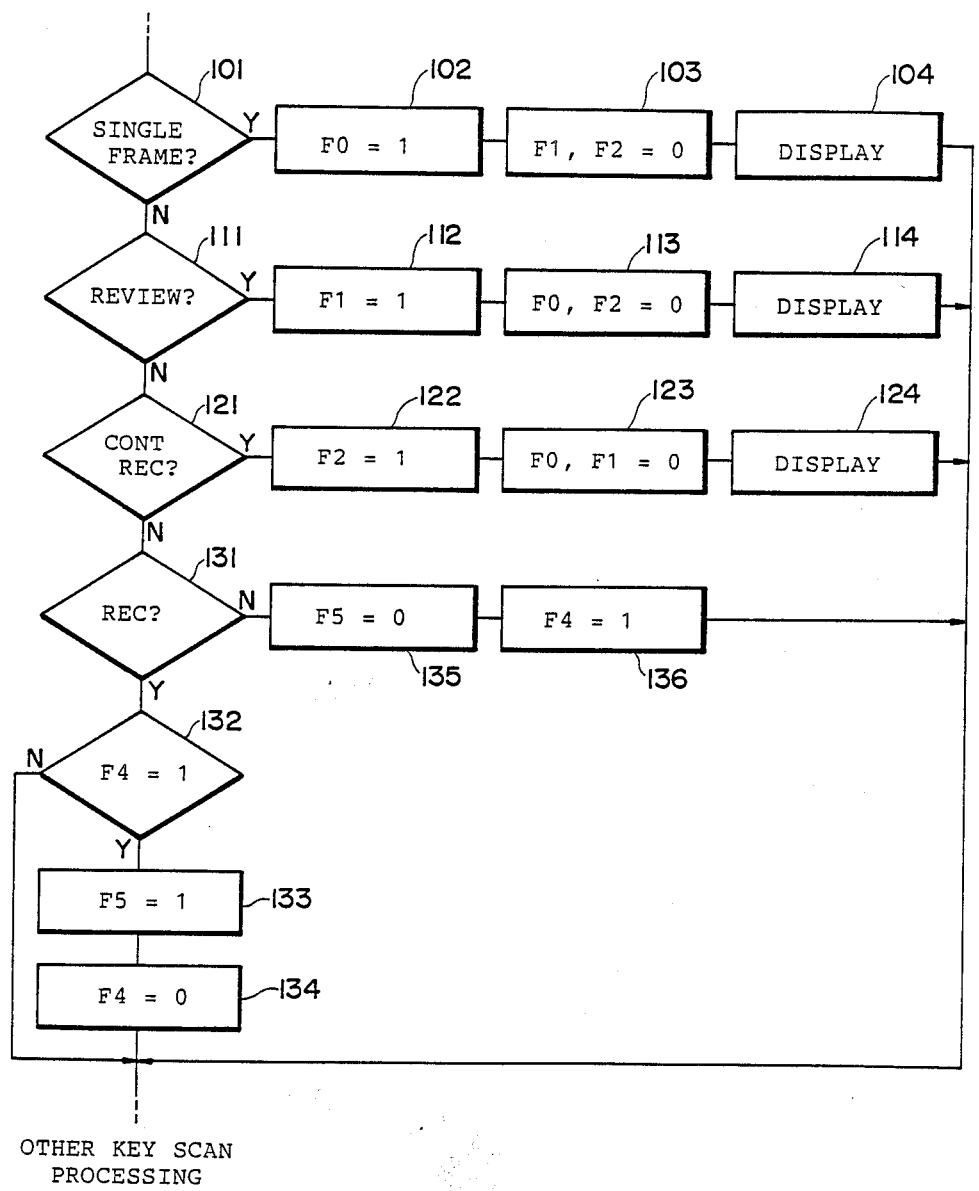

FIG. 6 illustrates a portion of the key scan routine. To make the routine easier to understand, the flowchart is expressed in such a manner that processing is performed when there is a key input.

The control unit 50, especially the memory thereof, is provided with a flag F0 for memorizing that the single-frame key 43 has been pressed, a flag F1 for memorizing that the review key 42 has been pressed, a flag F2 for memorizing that the continuous recording key 41 has been pressed, a flag F4 for judging the start of depression (leading edge) of the recording key 33, and a flag F5 for memorizing that the recording key 33 has been pressed. The flag F4 is set to "1" by initialization processing.

When the single-frame key 43 is pressed, the flag F0 is set to "1", the flags F1, F2 are reset to "0", and the indicator lamp 47 lights (steps 101, 102, 103, 104 in the flowchart of FIG. 6). When the review key 42 and continuous recording key 41 are pressed, the corresponding processing is executed (steps 111–114, 121–124).

When the recording key 33 is pressed, the flag F5 is set to "1" on the condition that the flag F4 has been set (i.e. detection of the initial leading edge), and then the flag F4 is reset to "0" (steps 131–134). Accordingly, once the flag F4 is reset, in the next key scan routine the decision rendered at step 132 (F4=1?) is NO even if an affirmative decision with regard to depression of the recording key 33 (YES at step 131). Therefore, flags F5, F4 are held at the states currently prevailing.

If a decision is rendered in the key scan routine to the effect that the recording key 33 is not being pressed, then flag F5 is reset and flag F4 is set (steps 135, 136).

Figure 7:
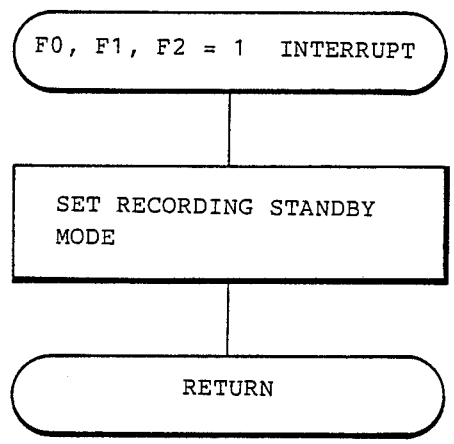

FIG. 7 illustrates processing executed when any of flags F0–F2 is set. The processing of FIG. 7 and processing shown in FIG. 8, which is described below, is interrupt processing that entails observing the states of the aforementioned flags at a fixed cycle (e.g. 10 ms) and, if a flag has been set, proceeding to the corresponding processing.

If any of the flags F0, F1, F2 has been set, recording standby mode setting processing, namely processing for turning on the switch 69 and changing the switches 65, 68 over to the recording side (terminals a), is executed. At this time, the first two main conditions for recording mentioned above are checked. If these conditions are unsatisfied, a warning display appears on the display device 17.

Figure 8:
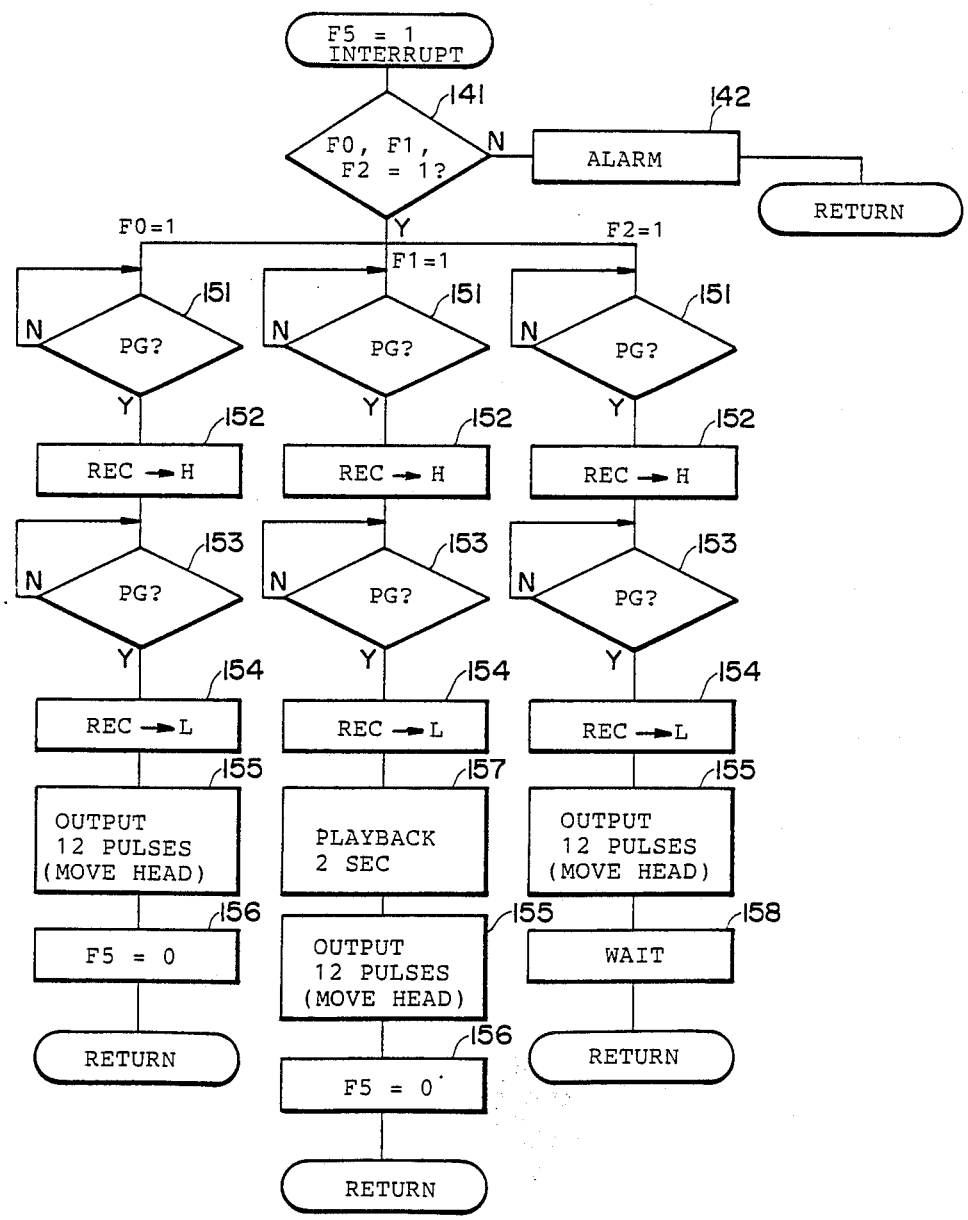

FIG. 8 illustrates interrupt processing executed in response to setting of the flag F5.

First, a check is made to determine if any of the flags F0, F1, F2 has been set (step 141). This corresponds to a check for determining whether the third condition for recording has been satisfied. If none of these flags have been set, a warning is displayed on the display device 17 and interrupt processing is ended (step 142).

When the flag F0 has been set, this indicates single-frame recording. In this case, input of the phase pulse PG is awaited. When the pulse PG is inputted (step 151), the recording control signal REC is raised to the H level to turn on the switch 64 (step 152). When the next phase pulse PG is inputted, the signal REC is sent to the L level to turn off the switch 64 (steps 153, 154). One frame of the inputted still video signal thus is recorded on the magnetic disk 21.

Thereafter, 12 forward shift pulses are applied to the stepping motor of head transfer drive control device 57, whereby the motor is rotated to transfer the magnetic head 51 one track (100 μm) inward (step 155). This is followed by resetting the flag F5 (step 156). Since the flag F5 is reset, single-frame recording processing will not be performed unless the recording key 33 is pressed again to set the flag F5 at step 133 in FIG. 6.

Interrupt processing for a transition to other operating modes is inhibited during the execution of steps 151–153 and step 155.

If F1=1, recording review processing is executed. Since this processing coincides with that of the above-described single-frame picture processing in many respects, the identical steps are assigned the same step numbers. In accordance with recording review processing, playback processing is executed when the single-frame recording processing of steps 151-154 ends. As described above, playback processing involves turning switch 69 off and changing over only the changeover switch 65 to the playback side (terminal b) for a period of two seconds. Thereafter, the magnetic head 51 is fed one track in the forward direction and the flag F5 is reset.

If the flag F2 has been set, this indicates continuous recording. This processing also has many steps in common with single-frame recording processing. Since continuous recording involves executing single-frame recording continuously as long as the recording key 33 is being pressed, there is no processing for resetting the flag F5 in step 156 of single-frame recording processing. Instead, after the magnetic head 51 has been fed one track in the forward direction, the system enters a routine (step 158) which involves waiting for a short period of time until the magnetic head 51 completely stops. This WAIT processing step is followed by a return. However, if the recording key 33 is still being pressed to set the flag F5, the system again enters the interrupt routine so that single-frame recording is performed in the same manner.

As many apparently widely different embodiments of the present invention can be made without departing from the spirit and scope thereof, it is to be understood that the invention is not limited to the specific embodiments thereof except as defined in the appended claims.

What is claimed is:

1. A still video signal playback apparatus having a magnetic head transfer device for supporting a magnetic head which is movable radially of a rotating magnetic recording medium on which are provided a plurality of circular, concentrically arranged tracks, and for moving the magnetic head a predetermined amount in a predetermined direction, and a playback processing circuit for processing a still video signal read from the magnetic recording medium by the magnetic head and outputting the processed still video signal to an output terminal as a still video signal, said apparatus comprising:
   a recording processing circuit for processing a video signal supplied to an input terminal and outputting a still video signal for recording;
   a first switch for setting an ordinary recording mode;
   a second switch for setting a recording review mode;
   a changeover switching circuit for selectively connecting the magnetic head to an input side of said playback processing circuit and an output side of said recording processing circuit;
   recording control means responsive to a switching input from either of said first and second switches for controlling said changeover switching circuit in such a manner that the magnetic head is connected to the output side of said recording processing circuit at a predetermined timing;
   first transfer control means responsive to a switching input from said first switch for executing control in such a manner that said magnetic head transfer device is driven to move the magnetic head one track in a predetermined direction after recording under control of said recording control means ends;
   review control means responsive to a switching input from said second switch for controlling said changeover switching circuit in such a manner that the magnetic head is connected to the input side of said playback processing circuit for a predetermined period of time after recording under the control of said recording control means ends; and
   second transfer control means for executing control in such a manner that said magnetic head transfer device is driven to move the magnetic head one track in a predetermined direction after playback for a predetermined period of time ends following changeover to the playback side by said review control means.

2. The apparatus according to claim 1, further comprising:
   video output control switching means connected between said input terminal to which the video signal is inputted and said output terminal from which said playback still video signal is outputted, and
   switching control means for rendering said video output control switching means conductive when a recording operation is in effect and non-conductive when a playback operation inclusive of a playback operation in said recording review mode is in effect.

3. The apparatus according to claim 1, further comprising:
   synchronizing signal generating circuit for generating a video signal synchronizing signal for controlling a rotational phase of a motor for rotating said magnetic recording medium, said synchronizing signal generating circuit including:
      an oscillator circuit for producing said synchronizing signal;
      a synchronizing separator circuit for extracting the synchronizing signal from an inputted video signal; and
      a change over switch for selecting an output of said synchronizing separator circuit in the recording mode and an output of said oscillator circuit in a playback mode; and
   means for executing control in such a manner that said change over switch selects the output of said synchronizing separator circuit at the time of a playback operation performed for a predetermined period to time after recording has been carried out in a recording review mode set by said second switch.

4. In a still video signal recording/playback apparatus having a magnetic head transfer device for holding a magnetic head which is movable radially of a rotating magnetic recording medium on which are provided a plurality of circular, concentrically arranged tracks, and for moving the magnetic head a predetermined amount in a predetermined direction, a playback processing circuit for processing a still video signal read from the magnetic recording medium by the magnetic head and outputting the processed still video signal, a recording processing circuit for processing a video signal supplied to an input terminal and outputting a still video signal for recording, a recording review mode setting switch, and a change over switching circuit for selectivity connecting the magnetic head to an input side of said recording processing circuit, a recording review method comprising the following steps executed by control unit in response to an input from said recording review mode setting switch:
   controlling said change over switching circuit in response to an input from said recording review mode switch in such a manner that the magnetic head is connected to the output side of said recording processing circuit at a predetermined time in order to perform a recording operation;

controlling said change over switching circuit in such a manner that the magnetic head is connected to the input side of said playback processing circuit for a predetermined period of time in order to playback a recorded still image after said recording operation ends; and controlling said magnetic head transfer device in such a manner that said magnetic head is moved one track in a predetermined direction in order to perform the next recording operation after playback of said recorded still image ends.

5. A still video signal recording/playback apparatus having a motor for rotating a magnetic disk, a phase detector for generating a signal representing rotational phase of the magnetic disk, a circuit for generating a video signal synchronizing signal, and a motor controller, to which are inputted a phase signal produced by the phase detector and the synchronizing signal generated by the synchronizing signal generating circuit, for controlling the motor in such a manner that the motor rotates at a predetermined rotational speed and the phase signal and synchronizing signal inputted to said motor controller are held in a predetermined relationship, wherein said synchronizing signal generating circuit comprises:

an oscillator circuit for producing the synchronizing signal;

a synchronizing separator circuit for extracting the synchronizing signal from an inputted video signal; and a changeover switch for selecting an output of said synchronizing separator circuit in a recording mode and an output of said oscillator circuit in a playback mode;

said apparatus further including means for controlling the changeover switch in such a manner that, when a recording review mode included in a recording mode has been set, said changeover switch selects the output of said synchronizing separator circuit also at the time of a playback operation performed for a fixed period of time after recording.

* * * * *